United States Patent
Cho

(10) Patent No.: US 10,100,472 B2
(45) Date of Patent: Oct. 16, 2018

(54) MOVEABLE BOARDING BRIDGE

(71) Applicant: Korea Airports Corporation, Seoul (KR)

(72) Inventor: Seung Sang Cho, Seo-gu Incheon (KR)

(73) Assignee: Korea Airports Corporation, Seoul (KR)

( * ) Notice: Subject to any disclaimer, the term of this patent is extended or adjusted under 35 U.S.C. 154(b) by 0 days.

(21) Appl. No.: 15/549,576

(22) PCT Filed: Nov. 12, 2015

(86) PCT No.: PCT/KR2015/012144
§ 371 (c)(1),
(2) Date: Aug. 8, 2017

(87) PCT Pub. No.: WO2016/159475
PCT Pub. Date: Oct. 6, 2016

(65) Prior Publication Data
US 2018/0044865 A1  Feb. 15, 2018

(30) Foreign Application Priority Data
Apr. 3, 2015 (KR) .................. 10-2015-0047397

(51) Int. Cl.
*E01D 19/00* (2006.01)
*E01D 19/08* (2006.01)
*B64F 1/305* (2006.01)

(52) U.S. Cl.
CPC ............ *E01D 19/086* (2013.01); *B64F 1/305* (2013.01)

(58) Field of Classification Search
CPC ................................ E01D 19/086; B64F 1/305
(Continued)

(56) References Cited

U.S. PATENT DOCUMENTS 4,715,077 A * 12/1987 Shepheard ............ B64F 1/3055
138/114
6,055,692 A * 5/2000 Pell ........................ B64F 1/305
14/71.5
(Continued)

FOREIGN PATENT DOCUMENTS

CN  201678049 (U)  12/2010
CN  102381484(A)  3/2012
(Continued)

OTHER PUBLICATIONS

International Search Report, PCT/US2015/012144, dated Feb. 5, 2016, 3 pages.
(Continued)

*Primary Examiner* — Raymond W Addie
(74) *Attorney, Agent, or Firm* — Daly, Crowley, Mofford & Durkee, LLP

(57) ABSTRACT

A movable boarding bridge includes: an inner tunnel; an outer tunnel disposed on an outer surface of the inner tunnel so as to slide on the inner tunnel; a roller arranged on the external surface of the inner tunnel; and a rainwater gutter-type rail arranged on the internal surface of the outer tunnel, and configured to guide the roller such that the roller moves along the rail and to allow inflowing rainwater from the outside to flow therethrough, wherein the rainwater gutter-type rail may be configured such that the rainwater gutter is not seen from the inner tunnel through which passengers pass.

8 Claims, 3 Drawing Sheets

(58) Field of Classification Search
USPC .................................................. 14/69.5–72.2
See application file for complete search history.

(56) References Cited

U.S. PATENT DOCUMENTS

| | | | | |
|---|---|---|---|---|
| 6,212,724 B1* | 4/2001 | Zhou | ..................... | B64F 1/3055 |
| | | | | 14/69.5 |
| 6,330,726 B1* | 12/2001 | Hone | ..................... | B64F 1/305 |
| | | | | 14/69.5 |
| 6,993,802 B1* | 2/2006 | Hone | ..................... | B64F 1/305 |
| | | | | 14/69.5 |
| 8,091,166 B2* | 1/2012 | Gil Coto | ................. | B64F 1/305 |
| | | | | 14/71.5 |

FOREIGN PATENT DOCUMENTS

| | | |
|---|---|---|
| JP | 07-032398 Y2 | 7/1995 |
| JP | 08-001199 Y2 | 1/1996 |
| JP | 2005193830 A | 7/2005 |
| KR | 100778140 (B1) | 11/2007 |
| KR | 101020719 B1 | 3/2011 |
| KR | 20120018249 A | 3/2012 |
| KR | 101474197 B1 | 12/2014 |

OTHER PUBLICATIONS

Written Opinion of the International Searching Authority, PCT/US2015/012144, dated Feb. 5, 2016, 6 pages.

* cited by examiner

MOVEABLE BOARDING BRIDGE

CROSS REFERENCE TO RELATED APPLICATIONS

This application is a U.S. National Stage of PCT application PCT/KR2015/012144 filed in the Korean language on Nov. 12, 2015, entitled "MOVEABLE BOARDING BRIDGE," which claims priority to Korean application 10-2015-0047397, filed on Apr. 3, 2015, which applications are each hereby incorporated herein by reference in their entireties.

TECHNICAL FIELD

The present invention relates to a movable boarding bridge, and more particularly, to a movable boarding bridge including a rail configured to guide a rainwater receiver and an inner tunnel.

BACKGROUND ART

In general, a movable boarding bridge includes an exposed-type rainwater receiver disposed on both sides of a surface identical to a bottom surface of an outer tunnel such that the boarding bridge may be disfigured, passengers and airport workers may experience inconvenience when moving, and an accident may occur due to a fall or false step.

A movable boarding bridge having a structure in which an exposed rainwater receiver for rainwater drainage is disposed on a floor of a double-structure outer tunnel may require separate parts, resulting in a high production cost. Also, the movable boarding bridge may include a double-structure inner tunnel, a double-structure outer tunnel, and a scroll for supporting an upper portion of the floor of outer tunnel, and the rainwater receiver for rainwater drainage is disposed inside the floor of double-structure outer tunnel and thus, there is a problem of how to clean and maintain the rainwater receiver.

Thus, there is need to develop an apparatus for separating a rainwater receiver from a footpath in a boarding bridge, and distributing a weight when an inner tunnel moves in an outer tunnel.

DISCLOSURE OF INVENTION

Technical Goals

An aspect of the present invention provides a safe and attractive movable boarding bridge in which a rainwater receiver is invisible from a boarding bridge.

Another aspect of the present invention provides a movable boarding bridge to solve the problem of a carpet being contaminated by rainwater flowing from a rainwater receiver when it rains.

Technical Solutions

According to an aspect of the present invention, there is provide a movable boarding bridge including an inner tunnel, an outer tunnel disposed on an outer surface of the inner tunnel so as to slide along an outside of the inner tunnel, a roller disposed outside the inner tunnel, and a rainwater receiver-type rail disposed on an inner surface of the outer tunnel, and configured to allow the roller to move such that rainwater flowing from an outside flows, wherein a rainwater receiver is not disposed on a bottom surface of the outer tunnel through which passengers pass.

The rainwater receiver-type rail is provided in a shape of an open ended rectangle.

The outer tunnel may include a frame configured to support the outer tunnel and having a hole at a bottom of the frame, and the rainwater receiver-type rail disposed on the frame, wherein the rainwater contained in the rainwater receiver-type rail is allowed to flow to the outside through the hole.

The hole formed in the frame may be formed on a portion neighboring each end of the rainwater receiver-type rail. The movable boarding bridge may further include a rainwater preventer disposed on the outer surface of the inner tunnel, wherein the rainwater preventer may be configured to allow rainwater to flow toward the rainwater receiver-type rail and prevent the rainwater from flowing into the roller disposed outside the inner tunnel. The rainwater preventer may be inclined at a predetermined angle such that the rainwater flows. The rainwater preventer may be detachable.

Effects

According to an embodiment of the present invention, it is possible to provide a rainwater receiver to be invisible to passengers in a tunnel by separating the rainwater receiver from a tunnel footpath.

According to another embodiment of the present invention, it is possible to prevent corrosion of a frame receiving a weight by distributing the weight by a rainwater receiver-type rail when an inner tunnel moves.

BEST MODE FOR CARRYING OUT THE INVENTION

Figure 1:
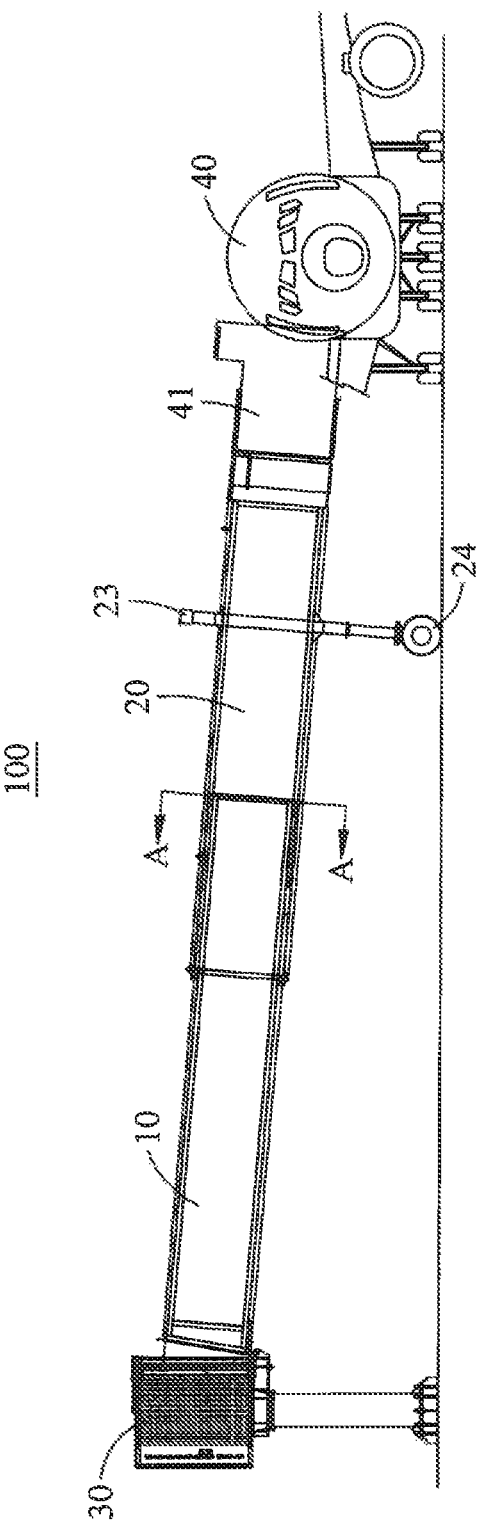
FIG. 1 is a diagram illustrating a movable boarding bridge according to an embodiment.
Figure 2:
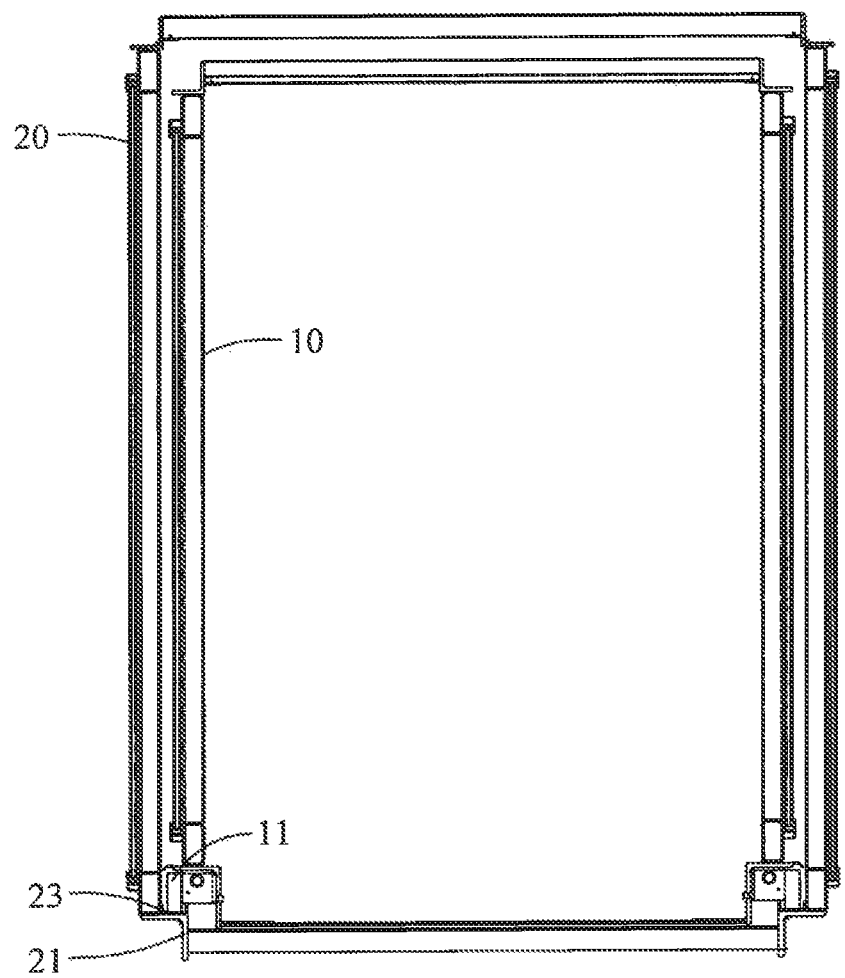
FIG. 2 is a cross-sectional perspective view of the movable boarding bridge of FIG. 1 cut along a line A-A according to an embodiment.
Figure 3:
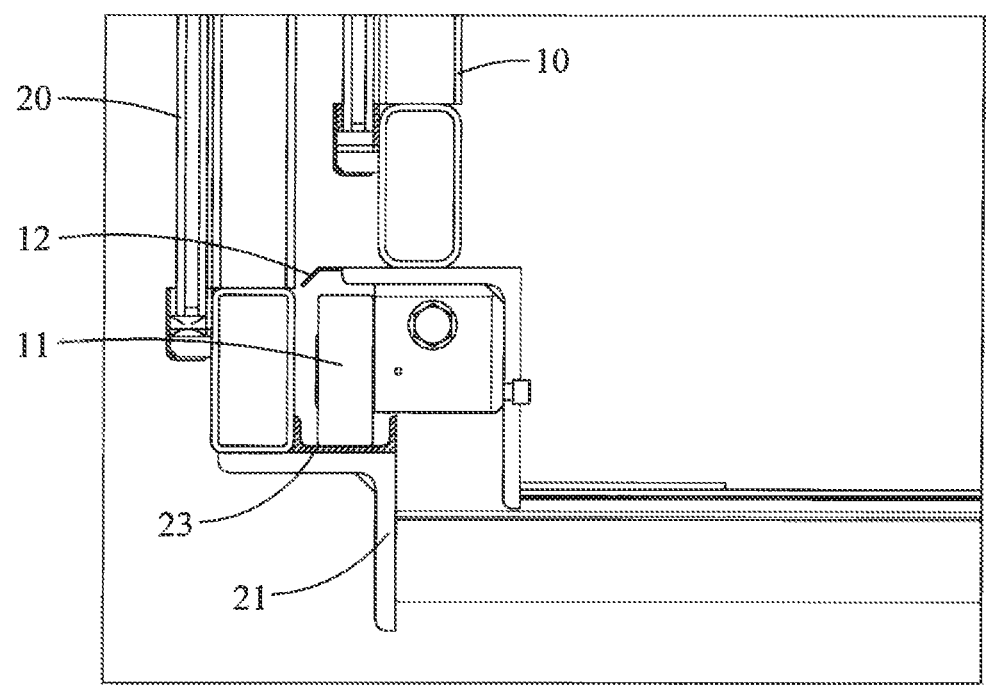
FIG. 3 is a diagram illustrating a tunnel including a rainwater receiver-type rail according to an embodiment.

FIG. 1 is a diagram illustrating a movable boarding bridge according to an embodiment, FIG. 2 is a cross-sectional perspective view of the movable boarding bridge of FIG. 1 cut along a line A-A according to an embodiment, and FIG. 3 is a diagram illustrating a tunnel including a rainwater receiver-type rail according to an embodiment. Descriptions are provided below.

A movable boarding bridge 100 is an apparatus for connecting an aircraft 40 and a boarding gate of an airport passenger terminal for passengers using the aircraft 40 at an airport to safely get on and off from the aircraft 40. Generally, the movable boarding bridge 100 includes a rotunda 30 of a boarding bridge, an inner tunnel 10 of the boarding bridge connected to the rotunda 30, an outer tunnel 20 of the boarding bridge which is rotatable in a direction identical to that of the inner tunnel 10 or movable toward a center of the inner tunnel 10, a cabin 41 and a lift column 23 connected to the outer tunnel 20, and a wheel 24 connected to the lift column 23 to allow the movable boarding bridge 100 to move. The inner tunnel 10 and the outer tunnel 20 are assembled and movable.

The movable boarding bridge 100 may be provided in a two-tunnel structure or a three-tunnel structure including the inner tunnel 10 and the outer tunnel 20 such that the boarding bridge freely moves so as to be safely connected to an aircraft based on whether an aircraft is parked in an apron and a parking location of the aircraft.

The outer tunnel 20 may be provided on an outer surface of the inner tunnel 10 so as to slide along an outside of the outer tunnel 20. A roller 11 may be provided on each side of a lower portion of the inner tunnel 10, the rainwater receiver-type rail 23 may be provided on each inner side of the outer tunnel 20, such that the inner tunnel 10 and the outer tunnel 20 are movable based on movements of the rainwater receiver-type rail 23 and the roller 11.

The roller 11 protruding from the outer surface of the inner tunnel 10 may be formed corresponding to the rainwater receiver-type rail 23 at a bottom of the outer tunnel 20 such that the roller 11 may move along the rainwater receiver-type rail 23.

The rainwater receiver-type rail 23 may be formed in a shape of an open ended rectangle. The roller 11 provided in the inner tunnel 10 may move along the rainwater receiver-type rail 23 provided in the outer tunnel 20.

A portion of rainwater falling on a ceiling portion of the inner tunnel 10 exposed to an outside of a movable boarding bridge in a two-tunnel structure or a three-tunnel structure when it rains may flow down a wall between the inner tunnel 10 and the outer tunnel 20 and then fall on the rainwater receiver-type rail 23 in the outer tunnel 20.

The fallen rainwater may be contained in the rainwater receiver-type rail 23 and prevented from being leaked from the rainwater receiver-type rail 23 in the shape of open ended rectangle.

The rainwater may be contained in the rainwater receiver-type rail 23 such that the rainwater may be prevented from being leaked to the inner tunnel 10.

A rainwater receiver may be disposed on both sides of an outer surface of an outer tunnel without disposing the rainwater receiver at a bottom surface of an outer tunnel through which passenger pass.

Detailed description is provided below.

The roller 11 may be provided on each lower portion of the inner tunnel 10, and the rainwater receiver-type rail 23 may be attached to the outer tunnel 20. Thus, the outer tunnel 20 may slide along the outside of the inner tunnel 10 so as to be reduced and extended by maintaining a predetermined space between tunnels.

The rainwater receiver-type rail 23 in a straight line type may be provided in each frame 21 in the outer tunnel 20 and the roller 11 of the inner tunnel 10 such that the roller 11 moves corresponding to a position of the roller 11.

The rainwater receiver-type rail 23 in a shape of an open ended rectangle is provided to contain the rainwater and disposed on a lower side of the outer tunnel 20 thereby allowing the rainwater flowing from an upper portion to flow.

The rainwater receiver-type rail 23 provided in the outer tunnel 20 may be provided on a side of the inner tunnel 10. The rainwater receiver-type rail 23 may prevent corrosion of the lower frame 21 receiving a structural weight of a boarding bridge and may extend a lifetime of the boarding bridge.

Also, a rainwater preventer 12 may be disposed above the roller 11 on the outer surface of the inner tunnel 10.

The rainwater preventer 12 may be inclined at a predetermined angle in order to prevent the rainwater from flowing into the inner tunnel 10. The rainwater preventer 12 may allow the rainwater to flow to the rainwater receiver-type rail 23 such that the rainwater is prevented from flowing into a roller provided on an outer surface of an inner tunnel.

The rainwater receiver 12 may be detachable. The rainwater preventer 12 may be formed in a shape of an open ended triangle and an L-shape, and may be provided at a predetermined slope angle greater than or equal to approximately 100 degrees.

Figure 4:
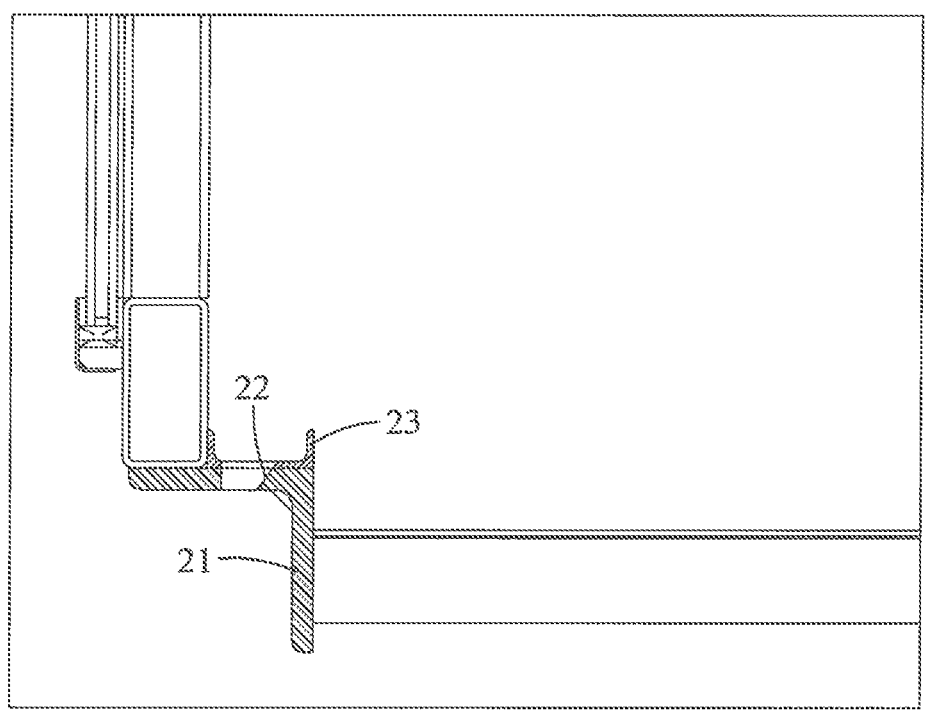
FIG. 4 is a diagram illustrating an outer tunnel according to an embodiment.

FIG. 4 is a diagram illustrating the outer tunnel 20 according to an embodiment. Description is provided below.

The rainwater receiver-type rail 23 may be provided on a portion in which the roller 11 disposed on each side of the inner tunnel 10 contacts the outer tunnel 20, and the rainwater receiver-type rail 23 may be disposed on each lower end of an inner surface portion of the outer tunnel 20.

The rainwater receiver-type rail 23 may be a path along which the roller 11 of the inner tunnel 10 moves, and have a structure that allows the rainwater flowing from the outside through the upper portion to flow.

Also, a bottom portion of the frame 21 supporting the outer tunnel 20 may be provided in an L-shape, and the rainwater receiver-type rail 23 may be provided in the L-shaped portion.

A hole may be provided on a bottom portion of a frame. A rail may be disposed on an upper portion of an L-shaped frame, and a hole 22 may be provided in the frame in order to discharge the rainwater contained in the rail to an outside. The hole 22 may be provided on a portion neighboring each end of the rail. The hole 22 may prevent the rainwater from entering the inner tunnel 10 and may be provided in a drainage structure of discharging the rainwater to the outside.

Thus, a rainwater receiver-type rail may be invisible from an inner tunnel through which passengers pass and thus, attractiveness may be provided.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:
1. A movable boarding bridge comprising:
an inner tunnel;
an outer tunnel disposed on an outer surface of the inner tunnel so as to slide along an outside of the inner tunnel;
a roller disposed outside the inner tunnel;
a rainwater receiver-type rail disposed on an inner surface of the outer tunnel, and configured to support the roller to move wherein rainwater flowing from an outside flows within the rainwater receiver-type rail;
a rainwater preventer disposed on the outer surface of the inner tunnel and configured to allow rainwater to flow towards the rainwater receiver-type rail,
wherein the rainwater receiver-type rail is not disposed on a bottom surface of the outer tunnel through which passengers pass, and
the rainwater receiver-type rail is disposed on a side of the inner tunnel and at a position higher than that of a bottom surface of the inner tunnel.

2. The movable boarding bridge of claim 1, wherein the rainwater receiver-type rail is provided in a shape of an open ended rectangle.

3. The movable boarding bridge of claim 1, wherein the outer tunnel includes:
- a frame configured to support the outer tunnel and having a hole at a bottom of the frame; and
- the rainwater receiver-type rail disposed on the frame,
- wherein the rainwater contained in the rainwater receiver-type rail is allowed to flow to the outside through the hole.

4. The movable boarding bridge of claim 3, wherein the hole formed in the frame is formed on a portion neighboring each end of the rainwater receiver-type rail.

5. The movable boarding bridge of claim 1, wherein the rainwater preventer is disposed on the roller, and
- configured to prevent the rainwater from flowing into the roller.

6. The movable boarding bridge of claim 5, wherein the rainwater preventer is inclined at a predetermined angle such that the rainwater flows.

7. The movable boarding bridge of claim 5, wherein the rainwater preventer is detachable.

8. The movable boarding bridge of claim 1, wherein the rainwater receiver-type rail is disposed on the side of the inner tunnel.

\* \* \* \* \*